United States Patent [19]
Goto

[11] Patent Number: 5,923,440
[45] Date of Patent: Jul. 13, 1999

[54] FACSIMILE APPARATUS WHICH OUTPUTS A COMMUNICATION MONITOR LIST

[75] Inventor: Tetsuya Goto, Shizuoka-ken, Japan

[73] Assignee: Kabushiki Kaisha TEC, Shizuoka, Japan

[21] Appl. No.: 08/800,688

[22] Filed: Feb. 14, 1997

[30] Foreign Application Priority Data

Feb. 16, 1996 [JP] Japan ................................. 8-028902
Jan. 10, 1997 [JP] Japan ................................. 9-002686

[51] Int. Cl.⁶ .................................................. H04N 1/00
[52] U.S. Cl. ........................ 358/406; 358/400; 358/437; 358/504
[58] Field of Search ........................ 358/400, 404–406, 358/434, 435, 437, 441, 468, 504; 399/110; 395/113, 835, 838, 839; 379/100.05, 100.06

[56] References Cited

U.S. PATENT DOCUMENTS 5,134,501  7/1992  Satomi et al. ........................ 358/400
5,280,366  1/1994  Araki ................................. 358/453

FOREIGN PATENT DOCUMENTS 61-177857  8/1986  Japan .
4-165752  6/1992  Japan .

*Primary Examiner*—Arthur G. Evans
*Assistant Examiner*—Sterling W. Chandler
*Attorney, Agent, or Firm*—Pillsbury Madison & Sutro LLP

[57] ABSTRACT

A facsimile apparatus generating a monitor report. The facsimile apparatus stores kinds of causes of communication troubles and codes corresponding to the kinds of causes of the communication troubles. A control circuit recognizes an occurrence of the communication troubles during facsimile communication, self-diagnoses the cause of the occurrence of the communication troubles, and searches for a corresponding code. A monitor list then includes the cause of the occurrence of the communication troubles in accordance with communication trouble information if the communication trouble information has been stored.

7 Claims, 7 Drawing Sheets

SELF STATION
(SENDING STATION)

OPPOSITION STATION
(RECEIVING STATION)

```
***  COMMUNICATION MONITOR LIST  ***
DATE       : 1995/10/27  17:26
MODE       : ECM
RESOLUTION : FINE
RESULT     : ERROR

SELF          OPPOSITION           CONTENTS OF
SATATION      SATATION            A COMMUNICATION
              1  CED
              2  NSF        00 00 34 56 78 90 12 34 56 78
                            98 65 45 87 32 56 84 00 00 FF
                            FF 00 01 01 01 22 22 FE
              3  CSI        31 32 33 00 34 35 36 00 37 38

4  DIS        00 EE F8 C4 80 11
 5 TSI                      39 38 37 00 36 34 32 00 31 31
 6 DCS                      00 A2 F8 C4 80 01
 7 TCF
              8  CFR
 9 PIX
10 PPS・MPS                 00 00 32
11 PPS・MPS                 00 00 32
12 PPS・MPS                 00 00 32
         ← ← ← ← ← ERROR OCCURED: T4 TIMER TIMEOUT
13 DCN

***  COMMUNICATION END  ***
```

F I G. 7

FACSIMILE APPARATUS WHICH OUTPUTS A COMMUNICATION MONITOR LIST

BACKGROUND OF THE INVENTION

1. Field of the Invention

The present invention relates to a facsimile apparatus which sends or receives documents, as image data, from other facsimile apparatus through a commercial telecommunication line in accordance with a predetermined communication protocol. During the communication, a facsimile apparatus memorizes communication protocol data exchanged with another facsimile apparatus, and the facsimile apparatus outputs the communication protocol data as a monitor list in response to a request.

2. Description of the Related Art

A facsimile apparatus which is mostly used in offices and homes, may be a G III facsimile device or a G IV facsimile device. Most G III facsimile devices or G IV facsimile devices have a function which memorizes communication protocol data in a memory, step by step, until the facsimile transmission is ended. In general, a facsimile communication protocol follows Recommendation T.30 of the ITU-T (International Telecommunication Union-Telecommunication Sector). The communication protocol data shows a communication process history according to the communication protocol.

A maintenance person can obtain the communication protocol data as a monitor list outputted from the memory and can learn a status of the facsimile device from the monitor list when a communication problem occurs, even if some time passed since the problem. Thus, the maintenance person can take suitable action without waiting for the problem to repeat itself. However, it is extremely difficult in practice to specify exactly the time the communication problem occurred and the cause of the problem, and thus, it may take a long time until suitable action is taken.

A conventional method will be described with reference to FIG. 1. FIG. 1 shows a facsimile communication protocol in a multi-page transmission/reception in accordance with the ITU-T Recommendation T.30. In this instance, a sending station outputs a monitor list. The sending station is a facsimile device which sends a document while scanning the document.

In FIG. 1, the protocol prior to the transmission of a page of an image signal is not explained in detail. After a sending station sends a PIX signal (a page of the image signal), it further sends a PPS·MPS signal (a part-page signal·multi-page signal). The PPS·MPS signal informs a receiving station of the end of the PIX signal and the sending station will send the PIX signal for the next document. On the other hand, after the receiving station detects the PPS·MPS signal following the PIX signal, the receiving station detects the end of the PPS·MPS signal. When the receiving station detects reception ready status for the next document, the receiving station sends a MCF signal (a message confirmation signal) to inform the sending station of the correct reception of the previous document image signal, and the receiving station waits for the next PIX signal. The sending station detects the MCF signal, and when the sending station is ready to send the next document, the sending station starts to send the next PIX signal, as was done for the previous PIX signal. The above operation is repeated as long as the document to be transmitted exists.

FIG. 2 shows a case wherein a communication problem occurs during the facsimile transmission. In FIG. 2, the facsimile transmission is terminated by issuing a disconnect signal (a DCN signal) because the communication problem after a retrying action is experienced following a first PPS·MPS signal outputted from the sending station. In the retrying action, second and third PPS·MPS signals are outputted from the sending station if the sending station does not receive any response from the receiving station within a prescribed time from the output of the first PPS·MPS signal. The prescribed time is defined as "T4" by the ITU-T Recommendation T.30. If the response outputted from the receiving station is received by the sending station when the sending station outputs a second PPS·MPS signal, no further retrying action is executed.

Such communication processes are memorized into a random access memory (RAM), step by step, during the facsimile communication between the two facsimile devices. All of the data sent to or received from a facsimile device is stored in the memory during the facsimile communication.

When the maintenance person outputs a monitor list from the facsimile device, the contents stored in the memory are printed on a recording paper as a monitor list. A monitor list shows a presence of a communication problem and communication processes in the facsimile communication. However, it is difficult to specify the time when the communication problem occurred and the cause of the problem even if the monitor list is intensively inspected, because the monitor list gives some abbreviation of the signal in the facsimile communication.

According to the monitor list, in the above case, the maintenance person who has an abundant store of knowledge about the facsimile communication protocol can specify that the communication problem occurred at a point at which the DCN signal was issued instead of the MCF signal. This is because, if the communication is carried out normally, the MCF signal is issued after the PPS·MPS signal is issued.

However, it may be difficult in general to specify the cause of the communication problem from the monitor list even by the maintenance person. Incidentally, a T4 timer time-out in which the communication line is not connected after a prescribed time (T4) has passed at the third retrying action, an instantaneous breakdown of an electric current on the telephone circuit or a scanning paper jam in the facsimile device (the sending station) after transmitting the PPS·MPS signal three times may each be considered as a cause of the above communication problem. Since various possibilities are considered as a cause of the problem, it may take some time to specify a cause of the problem, and thus a suitable action in response to the problem will be late.

SUMMARY OF THE INVENTION

Accordingly, it is an object of the present invention to easily specify a cause of the communication problem by a facsimile apparatus.

It is another object of the invention to easily specify a point at which a communication problem has occurred in a course of a facsimile communication by a facsimile apparatus.

To accomplish the above-described objects, a facsimile apparatus comprises means for monitoring a facsimile communication and for storing a history of the facsimile communication; a printer for printing-out a monitor list based on the history of the facsimile communication; a memory for storing a plurality of error codes, each error code corresponding to a type of communication problem; means for recognizing an occurrence of a communication problem during a facsimile communication; means for self-diagnosing the cause of the communication problem and for searching for a corresponding error code; a memory for storing the corresponding error code; and means for modifying the monitor list to include the cause of communication problem indicated by the corresponding error code.

BRIEF DESCRIPTION OF THE DRAWINGS

These and other objects and advantages of the present invention will become more apparent and more readily appreciated from the following detailed description of the presently preferred exemplary embodiments of the present invention taken in conjunction with the accompanying drawings wherein:

FIG. 7 is a view showing a monitor list of the embodiment.

DETAILED DESCRIPTION OF THE PREFERRED EMBODIMENTS

Figure 1:
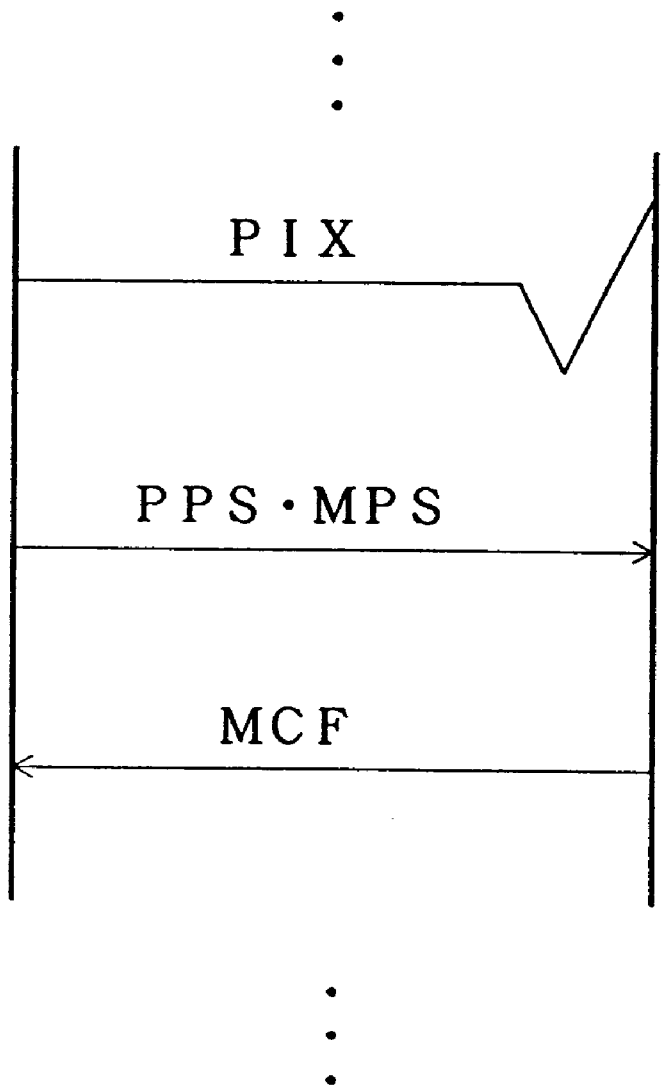
FIG. 1 is a facsimile communication protocol sequence without a communication problem in accordance with the ITU-T Recommendation T.30.

A facsimile apparatus according to an embodiment of the present invention will now be described in more detail with reference to the accompanying drawings. However, the same numerals are applied to similar elements in the drawings, and therefore, the detailed descriptions thereof are not repeated.

A facsimile apparatus of the embodiment is a sending station according to the facsimile communication protocol which is defined by the ITU-T Recommendation T.30.

Figure 3:
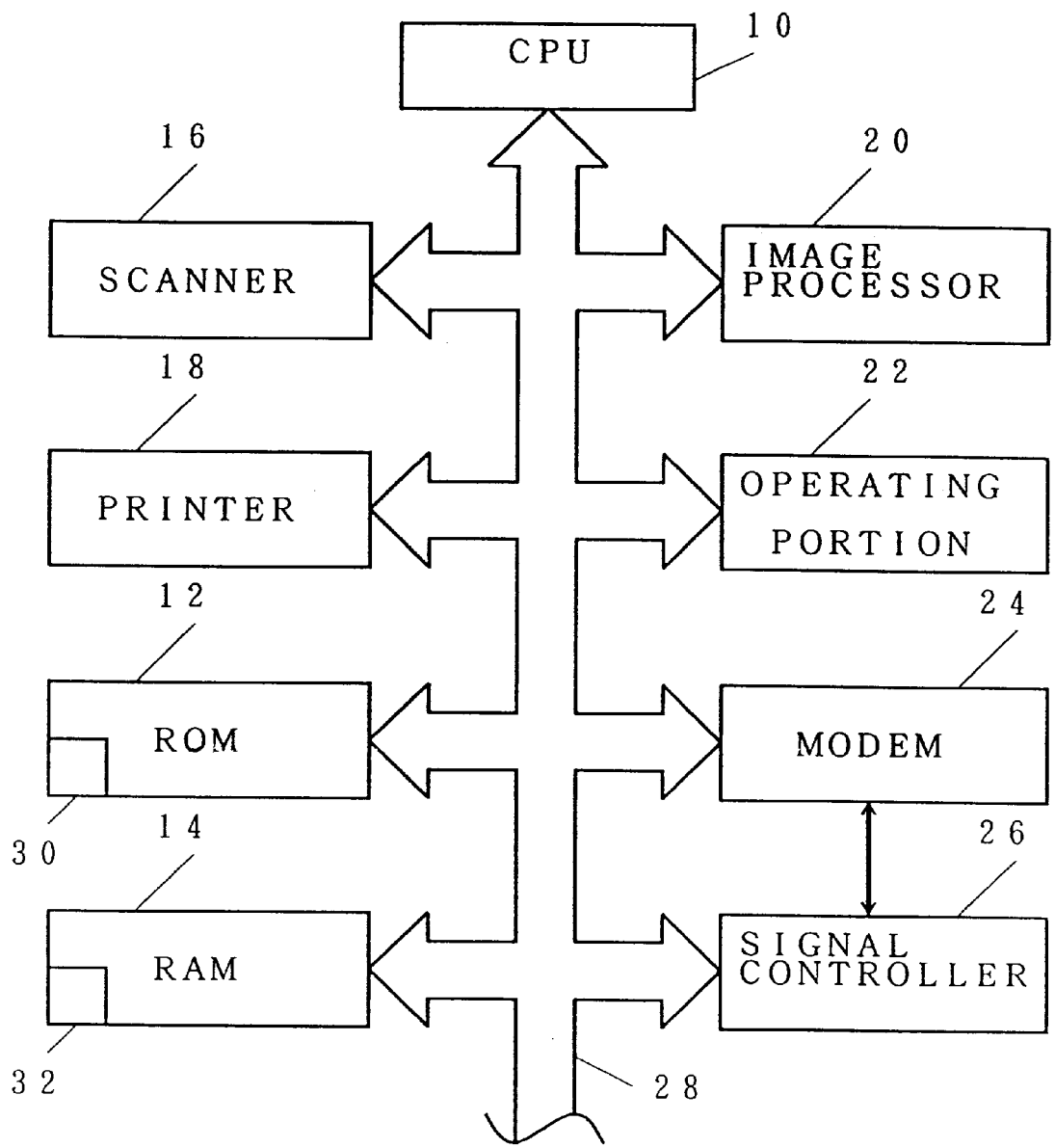
FIG. 3 is a block diagram showing the circuit arrangement of a facsimile apparatus according to an embodiment of the present invention.

FIG. 3 shows a block diagram of a facsimile apparatus of one embodiment of the present invention. The facsimile apparatus includes a CPU 10 which controls an overall operation of the facsimile apparatus. The CPU 10 is connected to a ROM 12, a RAM 14, a scanner 16, a printer 18, an image processor 20, an operating portion 22, a modem 24, and a signal controller 26 through a bus line 28.

The ROM 12 stores program data and other fixed data. The program data is carried out by the CPU 10 to control all components of the facsimile apparatus and to communicate to the other facsimile apparatus. The RAM 14 is used to temporarily store various data to be processed by the CPU 10 and provides memory areas to store image data and other various data. The scanner 16 includes a CCD and reads a document to be transmitted to produce an image signal. The printer 18 prints images onto a recording paper according to received image data from the other facsimile apparatus and is used to print a monitor list, which will be described later. The image processor 20 carries out a decoding/encoding operation of the image signal. The operating portion 22 includes a display and a keyboard having keys such as a ten key pad for inputting a facsimile number to be communicated, a one touch key, a start key, and the like. The keyboard is also used to request the output of the monitor list. The modem 24 is a V.21 modem which functions as a high speed modem or a low speed modem, selectively. The signal controller 26 detects a signal from the telephone line and transmits the detected signal to the modem 24. The signal controller 26 also transmits a signal received from the modem 24 to the telephone line, and has a function for calling.

In this embodiment, a trouble cause memory area 30 which stores a cause of communication trouble data is provided in a part of the ROM 12. A cause of communication trouble data is composed of a trouble code number and a content of communication trouble combined with the trouble code number. For instance, the trouble code number "03" indicates the instantaneous breakdown of an electric current. The trouble code number "04" indicates a paper jam. The trouble code number "05" indicates a T4 timer time-out. The content of a communication trouble is expressed by a human language which can be read by people. And the trouble cause memory area 30 stores a point code number to point out the time the communication trouble occurred in a communication data memory area 32, which will be described. To discriminate between the point code number and protocol code numbers, "2A", which is not used as a protocol code number, is assigned. The ROM 12 stores various data to output a monitor list such as protocol command data which is composed of a protocol command code number and a content of a protocol command combined with the protocol command code number.

Figure 4:
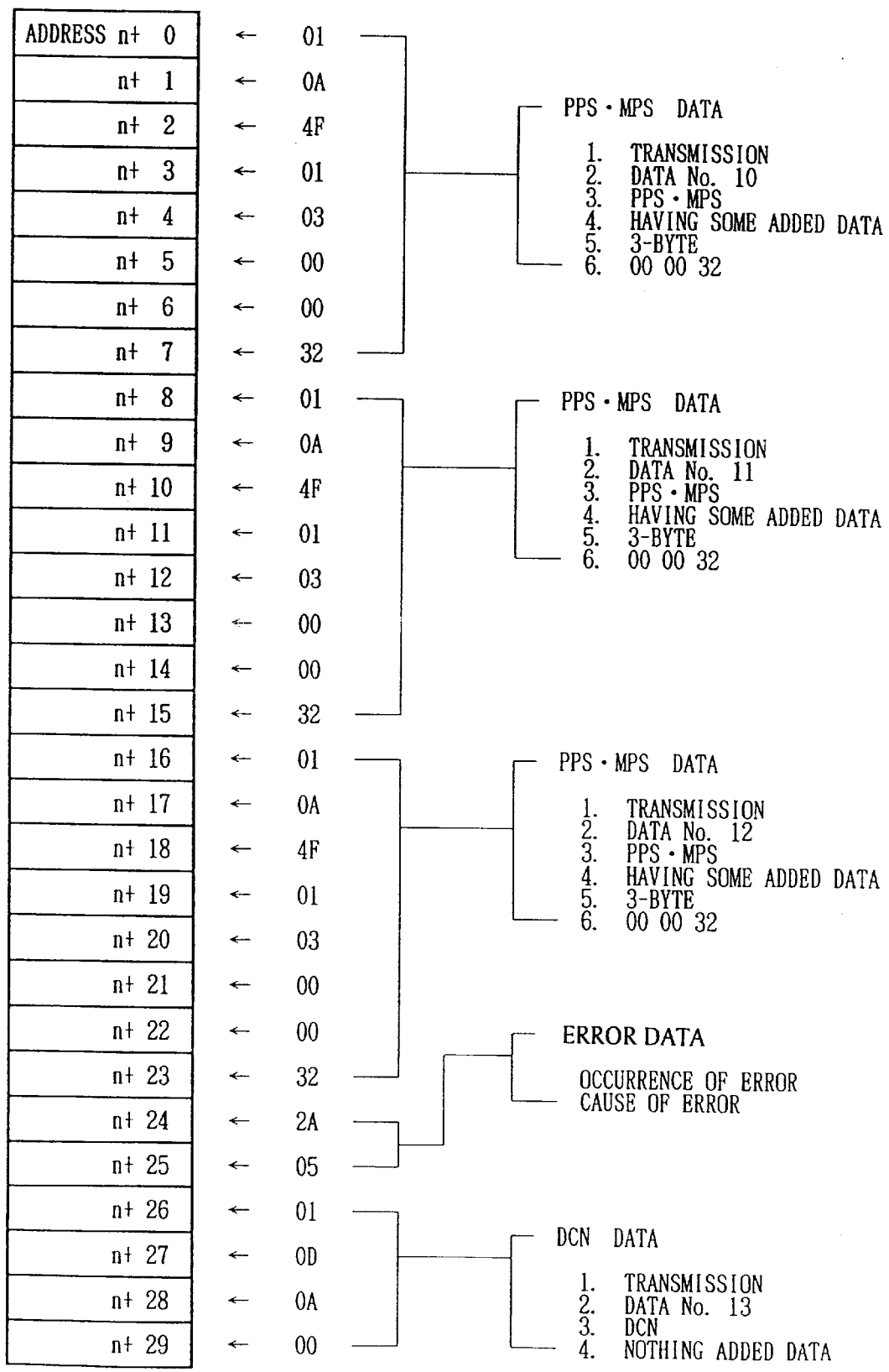
FIG. 4 is a part of an address table map showing a communication data memory area 32 set in a RAM 14 shown in FIG. 3.

FIG. 4 shows communication data contained in a communication data memory area 32 shown in FIG. 3. The communication data memory area 32 is provided in a part of the RAM 14. A communication data stored in the communication data memory area 32 is composed of a protocol command information data and a communication trouble information data. The protocol command information data includes the following items:

(1) classification of the communication data as to whether the data is sent or received.
(2) the order of the data irrespective of whether the data is sent or received.
(3) contents of the data.
(4) presence of an additional data in the data.
(5) a number of byte of the additional data when the additional data is present.
(6) contents of the additional data.

In the protocol command information data, the items (1) and (2) are auxiliary data which is used when printing a monitor list to easily understand whether the data is sent or received. The items (3), (4), (5), and (6) are included in sent or received data. The communication trouble information data includes the point code number and the trouble code number.

The facsimile apparatus of one embodiment of the present invention has communication protocol data memorizing means, monitor list outputting means, communication trouble detecting means, trouble cause discriminating means, communication trouble information data memorizing means, and output revision means. Each of these means is executed by the CPU 10 which executes the program stored in the ROM 12.

The communication protocol data memorizing means monitors communication protocol data during a communication and memorizes protocol command information data in the communication data memory area 32 on the basis of the monitored communication protocol data. The monitored communication protocol data is coded and is stored in the communication data memory area 32 in the order of its address number. The communication protocol data memorizing means memorizes a classification as to whether the data is sent data or received data and the order of the data as an auxiliary data, irrespective of whether the data is sent to or received from another facsimile apparatus, to easily understand a monitor list.

The monitor list outputting means outputs the communication data stored in the communication data memory area 32 on a recording paper as a monitor list in response to a request from the operating portion 22. The layout of the monitor list is edited on the basis of the auxiliary data before the monitor list is outputted.

The communication trouble detecting means detects an occurrence of communication trouble in a facsimile communication. The communication trouble detecting means has been provided heretofore and is carried out by a program (software) which detects an occurrence of trouble on the basis of a detection signal from a paper jam sensor to detect a jam of paper, an output signal from a timer to detect a lapse of a fixed time, and an output signal from an instantaneous breakdown detection circuit to detect an instantaneous breakdown of an electric current.

The trouble cause discriminating means diagnoses a cause of a communication trouble when the communication trouble detecting means has detected an occurrence of communication trouble and discriminates a trouble code number indicating the self-diagnosed cause of the communication trouble from the trouble cause memory area 30.

The communication trouble information data memorizing means memorizes the communication trouble information data including the point code number "2A" to specify the time the communication trouble occurred and a trouble code number discriminated by the trouble cause discriminating means in a pertinent area of the communication data memory area 32.

The output revision means modifies a content of the output of the monitor list on the basis of the communication trouble information data stored in the communication data memory area 32 when the communication trouble information data has been stored in the communication data memory area 32 and before the monitor list is outputted. The modified monitor list 34 (shown in FIG. 7) specifies the time the communication trouble occurred and the cause of trouble. Expressions for the time the communication trouble occurred and the cause of trouble have been established beforehand. In this embodiment, the time the communication trouble occurred is specified with a mark 36 consisting of some arrows, and the cause of trouble is specified with the human language expression 38 which can be read by people.

An operation of this facsimile apparatus will be described below with reference to the flowchart of FIGS. 5 and 6.

Figure 5:
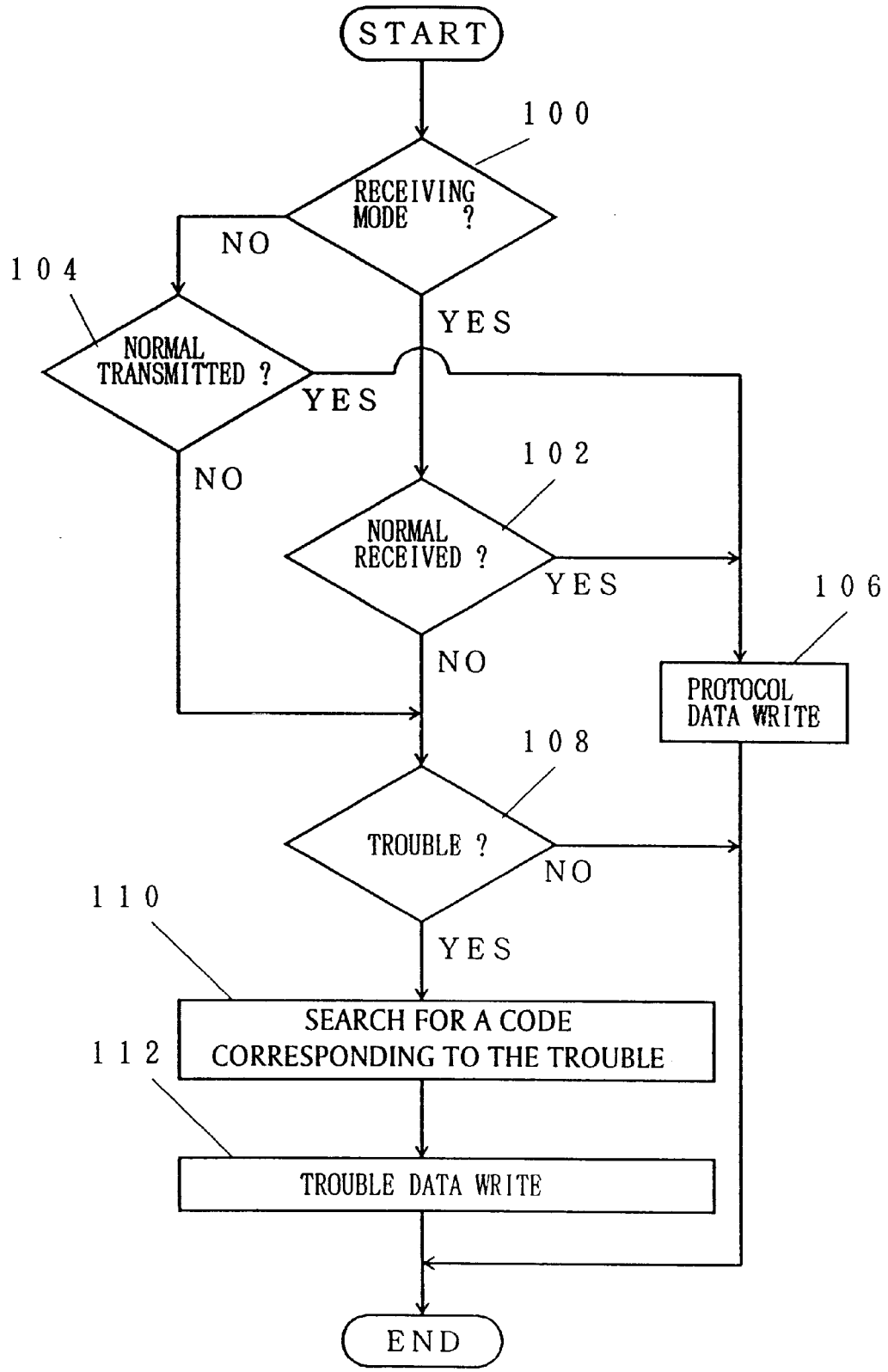
FIG. 5 is a flow chart for explaining a memorizing process of the communication data shown in FIG. 4.

FIG. 5 shows a flowchart for illustrating the operation of the data memorizing process which memorizes the communication data in the communication data memory area 32. This data memorizing process is carried out by the CPU 10 after a process relevant to a sent or received signal (a protocol command signal or the PIX signal) has been finished. The data memorizing process is further carried out after a trouble process has been finished.

When this process is started, it is checked whether a mode is a data receiving mode or a data sending mode (step 100). If the mode is the data receiving mode, it is checked whether the reception has been finished normally or not (step 102). In the step 100, if the mode is the data sending mode ("NO" in the step 100), it is checked whether the transmission has been finished normally or not (step 104). In the step 102 or 104, if the reception or transmission has been finished normally ("YES" in the step 102 or 104), the CPU 10 writes the protocol command information data which includes a received or sent protocol data and the auxiliary data in the communication data memory area 32 in the order of its writing address number (step 106). The writing address number is set in the RAM 14 when the CPU detects a start of a communication. A renewal of the writing address number is carried out when the CPU 10 writes a data in the communication data memory area 32. The auxiliary data includes a classification data of the communication data as to whether the data is a sent one or a received one and a data indicating the order of the data irrespective of whether the data is sent to or received from an other facsimile apparatus. The classification data is decided on the basis of the mode checked in the step 100. The data indicating the order data is decided on the basis of a counter which is provided in the RAM 14. A value of the counter is increased one by one when the CPU 10 detects a reception or transmission of a protocol command data, and it is cleared when the CPU 10 detects a completion of a communication. After writing data, the data memorizing process is finished.

Figure 2:
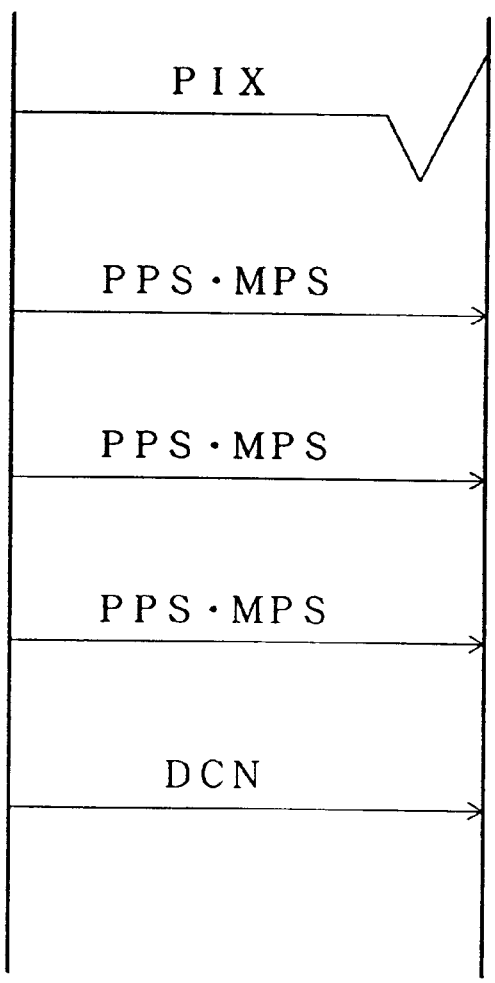
FIG. 2 is a facsimile communication protocol sequence with a communication problem in accordance with the ITU-T Recommendation T.30.

If the reception or transmission has not finished normally ("NO" in the step 102 or 104), the CPU 10 judges whether there is a communication trouble or not (step 108). For example, after a first transmission of the PPS·MPS signal shown in FIG. 2 is carried out, the CPU 10 judges that no communication trouble occurred in the step 108 even if the CPU 10 does not receive any response from the receiving station within the T4 time from the first transmission of the PPS·MPS signal. Because it is a first time-out, there is no detected trouble. On the other hand, after the third transmission of the PPS·MPS signal is carried out and the CPU 10 does not receive any response from the receiving station within the T4 time from the third transmission of the PPS·MPS signal, the CPU 10 judges that a communication trouble occurred in the step 108.

In the step 108, if the CPU 10 judges that no communication trouble occurred ("NO" in the step 108), the data memorizing process is finished. However, if the CPU 10 judges that a communication trouble occurred ("YES" in the step 108), the CPU 10 diagnoses a cause of the communication trouble and discriminates a trouble code number indicating the self-diagnosed cause of the communication trouble from the trouble cause memory area 30 (step 110). The discrimination of the trouble code number is carried out by searching the trouble cause memory area 30. In this embodiment, the cause of a communication trouble such as the instantaneous breakdown of an electric current, the paper jam, or the T4 timer time-out is discriminated by checking status data stored in the RAM 14. The status data is memorized by detecting a signal from various sensors. Upon execution of step 110, the CPU 10 writes the communication trouble information data in the communication data memory area 32 (step 112) and the CPU 10 increases the writing address number. The CPU 10 finishes the data memorizing process.

For example, the communication trouble shown in FIG. 2 occurs, three protocol command information data of three PPS·MPS signals outputted are stored into areas indicated by the address number from "n+0" to "n+23" of the communication data memory area 32, step by step. The point code number "2A" which points out the time the communication trouble occurred in the communication data memory area 32 is stored into a next area indicated by the next address number "n+24" because the CPU 10 does not receive any response from the receiving station within the T4 time from the third transmission of the PPS·MPS signal. A code number located after the point code number "2A" is discriminated as a trouble code number. A code number "05" is stored into a next address number area "n+25". As described above, since the code number "05" is located after the point code number "2A" the code number "05" is discriminated as a trouble code number, and the code number "05" means that the communication trouble has been caused by the time-out of the T4 timer When a maintenance person requests the output of the monitor list, the CPU 10 prints it on the basis of data stored in the communication data memory area 32.

Figure 6:
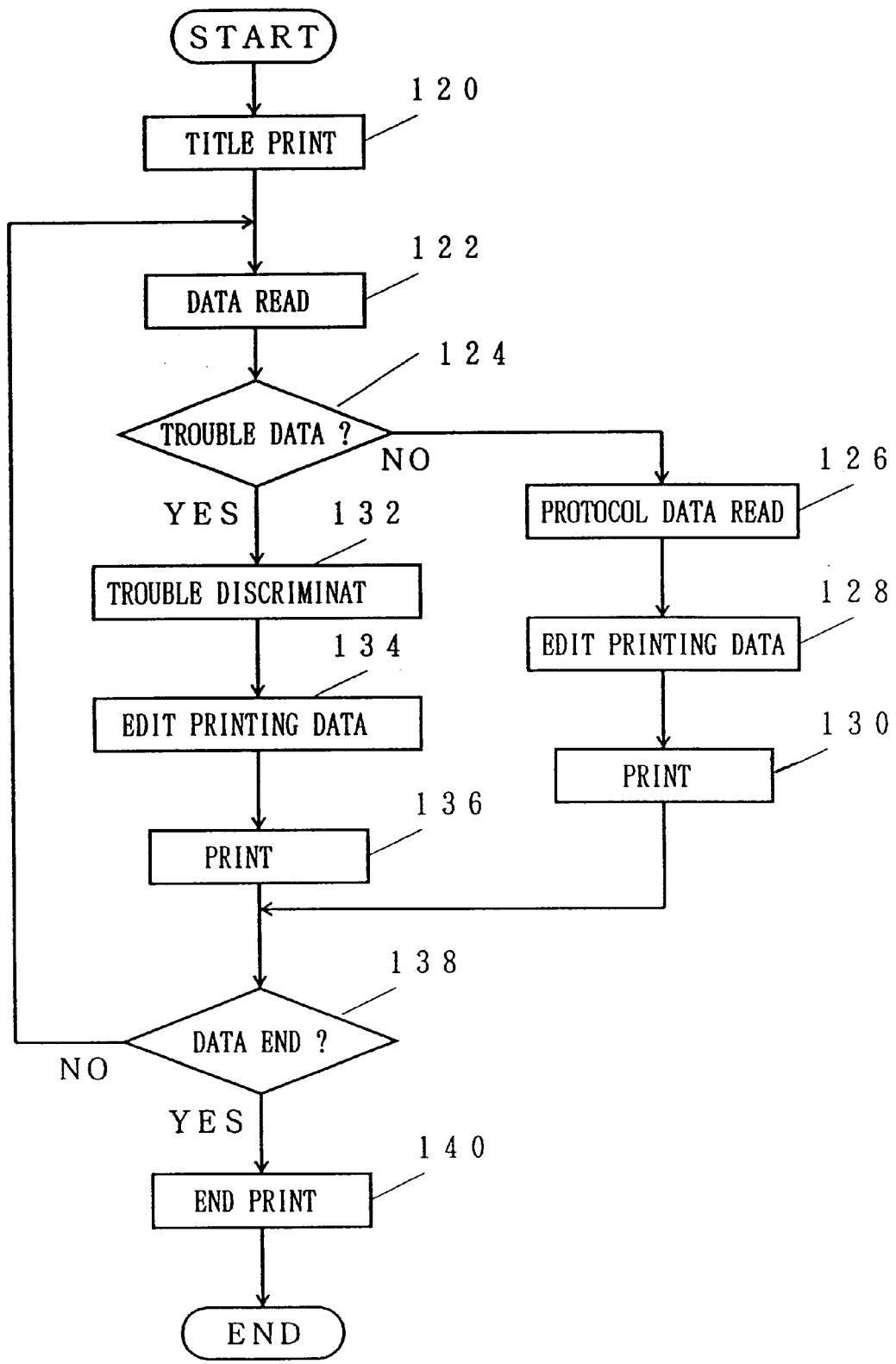
FIG. 6 is a flow chart for explaining a printing process of the monitor list of the embodiment.

FIG. 6 shows a flowchart illustrating the operation of a monitor list printing process. First of all, the CPU 10 prints a title, a date, a mode, a resolution, a result, and an index which is composed of "SELF STATION", "OPPOSITION STATION", and "CONTENTS OF A COMMUNICATION" on a recording paper (step 120). Thereafter, the CPU 10 reads data from an area indicated by a reading pointer which indicates an address number of the communication data memory area 32 (step 122). The reading pointer is first set on the first address number of a communication. After reading the data from the indicated area, it is checked whether the reading data is the communication trouble information data (step 124). This check is carried out by checking whether the reading data agrees with the point code number "2A" or not.

If the reading data does not agree with the point code number "2A" ("NO" in the step 124), the CPU 10 reads a protocol command information data from the communication data memory area 32 (step 126). After reading the protocol command information data, the CPU 10 edits printing data on the basis of the reading protocol command information data (step 128) and prints the protocol command information on the basis of the edited data on a recording paper (step 130).

On the other hand, if the reading data agrees with the point code number "2A" ("YES" in step 124), the CPU 10 reads data located after the point code number "2A" as a trouble code number and discriminates a content of communication trouble indicated by the trouble code number from the trouble cause memory area 30 (step 132). Upon execution of step 132, the CPU 10 edits a printing data on the basis of the point code number and the trouble code number (step 134) and prints the communication trouble information on the basis of the edited data on the recording paper (step 136).

After step 130 or 136 has been carried out, it is checked whether all of data stored in the communication data memory area 32 have been printed on the recording paper or not (step 138). If all of the data stored in the communication data memory area 32 has not been printed on the recording paper ("NO" in step 138), the CPU 10 carries out a process of step 122 again. On the other hand, if all of data stored in the communication data memory area 32 have been printed on the recording paper ("YES" in step 138), the CPU 10 prints "COMMUNICATION END" on the recording paper (step 140) and finishes the monitor list printing process.

FIG. 7 shows a monitor list of one embodiment. A monitor list 34 shown in FIG. 7 is printed on the basis of the communication data stored in the communication data memory area 32 shown in FIG. 4. In the monitor list 34, the time of the communication trouble occurred is specified with the mark 36 consisting of some arrows according to a location in the communication data memory area 32, and the cause of trouble is specified in a human language expression 38 which can be read by people. Namely, a mark such as "←←←←← TROUBLE OCCURRED: T4 TIMER TIMEOUT" is printed between a protocol command information of the third PPS·MPS signal and a protocol command information of the DCN signal. According to the monitor list 34, the maintenance person can easily specify that the communication trouble on which the CPU 10 does not receive any response from the receiving station within the T4 time from the third transmission of the PPS·MPS signal has occurred. And the maintenance person can rapidly take suitable action. Furthermore, as a layout of the monitor list 34 distinguishes a sending signal from a receiving signal, the maintenance person can easily specify that the communication trouble occurred at a self station or an opposition station.

The present invention is not limited to the above-mentioned embodiment. For example, the cause of the communication trouble has been printed at a point at which the communication trouble occurred, but it may be printed after printing all protocol command information. In this case, in addition to having an area for storing the protocol command information data, such as the communication data memory area 32, another storing area may be prepared for storing only communication trouble information data. The other storing area may be checked to determine whether the communication trouble information data is stored in the other storing area after printing the protocol command information. If communication trouble information data is stored in the other storing area, it may be printed on the recording paper. This means that the area storing the communication trouble information data is not limited by being only in the communication data memory area 32, and it is not always necessary to print the point at which the communication trouble occurred. In printing, the monitor list 34 begins from the top of the communication in this embodiment. If necessary, it may be carried out with only restricted protocol command information data which is related to the communication trouble. In this case, the CPU 10 searches the communication data memory area 32 to find the point code number "2A" and prints a protocol command information data located before and after of the point code number "2A" in the communication data memory area 32. Furthermore, the content of a communication trouble is expressed in a human language which can be read by people, in this embodiment. It may also print a trouble code number such as "05" only recognizable by a specialist, for example a maintenance person.

The present invention has been described with respect to a specific embodiment. However, other embodiments based on the principles of the present invention should be obvious to those of ordinary skill in the art. Such embodiments are intended to be covered by the claims.

What is claimed is:

1. A facsimile apparatus which carries out a facsimile communication with another facsimile apparatus, the facsimile apparatus comprising:

means for monitoring a facsimile communication and for storing a history of the facsimile communication;

a printer for printing out a monitor list based on the history of the facsimile communication;

a first memory for storing a plurality of error codes;

a second memory for storing a plurality of causes of communication trouble, each of the causes of communication trouble corresponding to a content of a corresponding on e of the error codes;

means for recognizing an occurrence of communication trouble during the facsimile communication;

means for self-diagnosing a cause of the communication trouble and for searching the plurality of error codes for the corresponding one of the error codes;

a third memory for storing the corresponding one of the error codes;

means for searching the plurality of causes of communication trouble for the cause of the communication trouble based on the corresponding error code; and means for modifying the monitor list to include the cause of communication trouble resulting from the searching means.

2. The facsimile apparatus according to claim 1 further comprising means for generating an error occurrence code when the means for recognizing recognizes the occurrence of the communication trouble, and means for modifying the history of the facsimile communication to include the error occurrence code.

3. The facsimile apparatus according to claim 1 further comprising means for generating an error occurrence time code indicating a time at which the occurrence of the communication trouble occurred.

4. The facsimile apparatus according to claim 3, wherein the time at which the occurrence of the communication trouble occurred is a relative time in a facsimile communication sequence.

5. The facsimile apparatus according to claim 1, wherein the printer prints the cause of communication trouble in a human readable form.

6. A method for generating a monitor list on which a history of facsimile communication is displayed, comprising:

previously storing a plurality of error codes;

previously storing a plurality of causes of communication trouble, each of the causes of communication trouble corresponding to a content of a corresponding one of the error codes;

monitoring a facsimile communication and storing a history of the facsimile communication;

printing out a monitor list based on the history of the facsimile communication;

recognizing an occurrence of communication trouble during the facsimile communication;

self-diagnosing a cause of the communication trouble and searching for the corresponding one of the error codes from the plurality of error codes;

searching for the cause of communication trouble from the plurality of causes of communication trouble based on the corresponding one of the error codes; and modifying the monitor list to include the cause of communication trouble resulting from the searching.

7. A method according to claim 7, wherein the self-diagnosing comprises storing the corresponding one of the error codes after the searching is executed.

* * * * *

UNITED STATES PATENT AND TRADEMARK OFFICE
CERTIFICATE OF CORRECTION

PATENT NO. : 5,923,440
DATED : July 13, 1999
INVENTOR(S) : GOTO

It is certified that error appears in the above-identified patent and that said Letters Patent is hereby corrected as shown below:

Column 8, claim 1, line 12, change "on e" to --one--.

Column 10, claim 7, line 1, change "claim 7" to --claim 6--.

Signed and Sealed this

Sixth Day of February, 2001

Attest:

Attesting Officer

Q. TODD DICKINSON
Director of Patents and Trademarks